United States Patent [19]
Bedard

[11] Patent Number: 5,126,120
[45] Date of Patent: Jun. 30, 1992

[54] CRYSTALLINE MICROPOROUS ZINC PHOSPHATE COMPOSITIONS

[75] Inventor: Robert L. Bedard, Fishkill, N.Y.

[73] Assignee: UOP, Des Plaines, Ill.

[21] Appl. No.: 645,082

[22] Filed: Jan. 23, 1991

Related U.S. Application Data

[63] Continuation-in-part of Ser. No. 591,915, Oct. 2, 1990, abandoned.

[51] Int. Cl.$^5$ ............................................. C01B 25/26
[52] U.S. Cl. ................................... 423/305; 423/328; 208/46; 208/112; 55/75; 585/250
[58] Field of Search .................. 423/305, 306, 328; 502/208, 214; 208/46, 112; 55/75; 585/250

[56] References Cited

U.S. PATENT DOCUMENTS

| | | | |
|---|---|---|---|
| 3,473,888 | 10/1969 | Berry et al. | 423/306 |
| 4,061,724 | 12/1977 | Grose et al. | 423/335 |
| 4,153,465 | 5/1979 | Hund et al. | 423/306 |
| 4,310,440 | 1/1982 | Wilson et al. | 252/435 |
| 4,398,926 | 8/1983 | Doshi | 55/16 |
| 4,440,871 | 4/1984 | Lok et al. | 502/214 |
| 4,500,651 | 2/1985 | Lok et al. | 502/208 |
| 4,589,888 | 5/1986 | Hiscock et al. | 55/26 |
| 4,723,966 | 2/1988 | Fuderer | 55/26 |
| 4,853,197 | 8/1989 | Wilson et al. | 423/306 |

FOREIGN PATENT DOCUMENTS

| | | | |
|---|---|---|---|
| 2842150 | 4/1980 | Fed. Rep. of Germany | 423/305 |
| 56-17912 | 2/1981 | Japan | 423/305 |
| 508471 | 6/1976 | U.S.S.R. | 423/305 |

OTHER PUBLICATIONS

M. T. Averbuch-Pouchot and A. Durif in *J. Applied Crystallography*, No. 7, p. 403 (1974).
T. Barbou des Courieres and M. H. Simonot-Grange in *Materials Research Bulletin*, vol. 12, pp. 355–360 (1977).
I. Tordjman et al. in Acta Crystl., B31, 1143 (1975).
O. V. Yakubovich & O. K. Mel'nikov in Sov. Phys. Crystallogr., 34, (1989).
A. W. Frazier et al. in *J. Agr. Food Chemistry*, vol. 14, pp. 522–529 (1966).
D. W. Breck, Zeolite Molecular Sieves, John Wiley & Sons, (1974), p. 636.
Worrall, W. E., "Clays and Ceramic Raw Materials", 2nd Ed., Elsevier, 1986, p. 16.

*Primary Examiner*—R. Bruce Breneman
*Attorney, Agent, or Firm*—Thomas K. McBride; Eugene I. Snyder; Frank S. Molinaro

[57] ABSTRACT

This invention relates to zinc phosphate molecular sieves. These molecular sieves have a three-dimenisonal microporous framework structure of $ZnO_2$ and $PO_2$ tetrahedral units, an intracrystalline pore system and an empirical chemical composition on an anhydrous basis expressed as ratio of the oxides by the formula: $rM_2O:sZnO:P_2O_5$, where M is at least one alkali metal, r ranges from about 0.9 to about 1.5 and s ranges from about 1.8 to about 3.0. These molecular sieves may be prepared by hydrothermal crystallization of a reaction mixture prepared by combining a reactive source of phosphorus, zinc, at least one alkali metal and water. This invention also relates to processes using these molecular sieves.

10 Claims, No Drawings

CRYSTALLINE MICROPOROUS ZINC PHOSPHATE COMPOSITIONS

CROSS REFERENCE TO RELATED APPLICATION

This application is a continuation-in-part of copending application Ser. No. 07/591,915 filed Oct. 2, 1990, now abandoned.

BACKGROUND OF THE INVENTION

Molecular sieves of the crystalline aluminosilicate zeolite type are well known in the art and now comprise over 150 species of both naturally occurring and synthetic compositions. In general, the crystalline zeolites are formed from corner-sharing $AlO_2$ and $SiO_2$ tetrahedra and are characterized by having pore openings of uniform dimensions, having a significant ion-exchange capacity and being capable of reversibly desorbing an adsorbed phase which is dispersed throughout the internal voids of the crystal without significantly displacing any atoms which make up the permanent crystal structure.

Other crystalline microporous compositions are known which are not zeolitic but which exhibit the ion-exchange and/or adsorption characteristics of the zeolites. These include: 1) a pure silica polymorph, silicalite, having a neutral framework containing neither cations nor cation sites as disclosed in U.S. Pat. No. 4,061,724; 2) crystalline aluminophosphate compositions disclosed in U.S. Pat. No. 4,310,440; 3) silicon substituted aluminophosphates as disclosed in U.S. Pat. No. 4,440,871 and 4) titanium substituted aluminophosphates as disclosed in U.S. Pat. No. 4,500,651.

Applicant has discovered a new class of molecular sieve materials which are a three-dimensional microporous crystalline zinc phosphate composition. These materials have a high framework charge and a high charge gradient which arises from the alternating $Zn^{+2}$ and $P^{+5}$ tetrahedral sites in the framework. They are capable of ion exchange, adsorption of gases and are useful as catalysts.

There are a number of reports dealing with the synthesis and characterization of zinc phosphate materials. For example the crystal structure of $Zn_2HK(PO_4)_2 \cdot 2H_2O$ has been reported by M. T. Averbuch-Pouchot and A. Durif in *J. Applied Crystallography*, No. 7, p. 403 (1974). Further, the properties of $KZn_2H(PO_4)_2 2.5H_2O$ has been reported by T. Barbou des Courieres and M. H. Simonot-Grange in *Materials Research Bulletin*, Volume 12, pp. 355–360 (1977). In this article the authors report that the zinc phosphate material contains water molecules which have partially zeolitic properties. However, heating of this material at temperatures of about 450° C. results in a collapse of the structure. More importantly, the structure of this material was determined by I. Tordjman et al. in Acta Cryst. B31, 1143 (1975) and showed that two of the zinc atoms in the unit cell were not tetrahedrally coordinated (See Table 4, pp. 1147–48). Therefore, this material does not have a framework made up of tetrahedrally coordinated zinc and phosphorus atoms. Other references include crystal structure of $(Na,K)(ZnPO_4)$ by O. V. Yakubovich and O. K. Mel'nikov in *Sov. Phys. Crystallogr.*, 34(1) (1989) and A. W. Frazier et al. in *J. Agr. Food Chemistry*, Volume 14, page 522–529 (1966). However, both of the materials reported in these references are dense phase materials with the former reference stating that their material has a $\beta$-tridymite structure.

In contrast to these references, applicant has synthesized a zinc phosphate molecular sieve which has a three-dimensional microporous framework structure of $ZnO_2$ and $PO_2$ tetrahedral units. That is, all the zinc and phosphorus atoms are tetrahedrally coordinated. Although the des Gourieres references states that their material has water which may be "zeolitic", the structure of their material shows that not all of the zinc atoms are tetrahedrally coordinated. Therefore, applicant is the first person to have synthesized a zinc phosphate molecular sieve in which all the zinc and phosphorus atoms are tetrahedrally coordinated.

SUMMARY OF THE INVENTION

This invention relates to a crystalline molecular sieve, a process for preparing the crystalline molecular sieve and a process for using the crystalline molecular sieve. Accordingly, one embodiment of the invention is a crystalline molecular sieve having: 1) a three-dimensional microporous framework structure of $ZnO_2$ and $PO_2$ tetrahedral units, 2) an intracrystalline pore system; and 3) an empirical chemical composition on an anhydrous basis expressed as the ratio of the oxides by the formula: $rM_2O:sZnO:P_2O_5$, where M is at least one alkali metal, r ranges from about 0.9 to about 1.5 and s ranges from about 1.8 to about 3.0.

Another embodiment of the invention is a process for preparing a crystalline molecular sieve having: 1) a three-dimensional microporous framework structure of $ZnO_2$ and $PO_2$ tetrahydral units; 2) an intracrystalline pore system; and 3) an empirical chemical composition on an anhydrous basis expressed as the ratio of the oxides by the formula: $rM_2O:sZnO:P_2O_5$, where M is at least one alkali metal, r ranges from about 0.9 to about 1.5, and s ranges from about 1.8 to about 3.0, the process comprising reacting a mixture containing reactive sources of zinc, phosphorus and M at a temperature and time sufficient to form the crystalline molecular sieve, the mixture having a composition expressed in terms of mole ratios of oxides of:

$$xM_2O:yZnO:P_2O_5:aH_2O$$

where x ranges from greater than 1 to about 4, y ranges from about 1.6 to about 3, the ratio of x:y is greater than 0.5, and ranges from about 20 to about 500.

Yet another embodiment of the invention is a process for separating a mixture of molecular species having different kinetic diameters comprising contacting the mixture with a crystalline molecular sieve having: 1) a three-dimensional microporous framework structure of $ZnO_2$ and $PO_2$ tetrahydral units; 2) an intracrystalline pore system; and 3) an empirical chemical composition on an anhydrous basis expressed by the formula: $rM_2O:sZnO:P_2O_5$, where M is at least one alkali metal, r ranges from about 0.9 to about 1.5, and s ranges from about 1.8 to about 3.0, the molecular sieve being partially activated and having pore diameters large enough such that at least some of the molecular species whose kinetic diameters are sufficiently small can enter the intracrystalline pore system of the molecular sieve.

A further embodiment of the invention is a process for separating a mixture of molecular species having different degrees of polarity comprising contacting the mixture with a crystalline molecular sieve having: 1) a three-dimensional microporous framework structure of $ZnO_2$ and $PO_2$ tetrahydral units; 2) an intracrystalline pore system; and 3) an empirical chemical composition on an anhydrous basis expressed by the formula: $rM_2O:sZnO:P_2O_5$, where M is at least one alkali metal, r ranges from about 0.9 to about 1.5, and s ranges from about 1.8 to about 3.0, the molecular sieve being at least partially activated in order to separate the mixture.

Yet another embodiment of the invention is a hydrocarbon conversion process comprising contacting a hydrocarbon under hydrocarbon conversion conditions with a crystalline molecular sieve having: 1) a three-dimensional microporous framework structure of $ZnO_2$ and $PO_2$ tetrahydral units; 2) an intracrystalline pore system; and 3) an empirical chemical composition on an anhydrous basis expressed by the formula: $rM_2O:sZnO:P_2O_5$, where M is at least one alkali metal, r ranges from about 0.9 to about 1.5, and s ranges from about 1.8 to about 3.0 to give a hydroconverted product.

These and other objects and embodiments of the invention will become more apparent after a more detailed description of the invention.

DETAILED DESCRIPTION OF THE INVENTION

As stated, the instant invention relates to a crystalline molecular sieve, a process for preparing the molecular sieve and processes using the molecular sieve. The crystalline molecular sieves of the instant invention have a three-dimensional microporous framework structure of $ZnO_2$ and $PO_2$ tetrahydral units. The molecular sieves of this invention have an intracrystalline pore system in which the pore openings can range from about 2 to about 10 Angstroms. Further, the molecular sieves of this invention have an empirical chemical composition on an anhydrous basis expressed as the ratio of the oxides by the formula; $rM_2O:sZnO:P_2O_5$, where M is at least one alkali metal such as lithium, sodium, potassium, rubidium and cesium. The molecular sieve can vary slightly from stoichiometry and thus r can range from about 0.9 to about 1.5 and s can vary from about 1.8 to about 3.0. Additionally, it is preferred that r range from about 0.9 to about 1.5 and s range from about 2.2 to about 3.0. The zinc phosphate molecular sieves of this invention can also reversibly adsorb water while retaining their crystal structure, i.e. their essential framework topology. By essential framework topology is meant the spatial arrangement of the Zn-O and P-O bond linkages. No change in the framework topology indicates that there is no disruption of these primary bond linkages.

The instant zinc phosphate molecular sieves are prepared by aqueous precipitation or hydrothermal crystallization of a reaction mixture prepared by combining a reactive source of phosphorus, zinc, at least one alkali metal and water. Generally any form of phosphorus acid or phosphorus oxides, phosphates and phosphites can be used. Specific examples of the phosphorus sources which can be used in this invention are orthophosphoric acid, pyrophosphoric acid, alkali phosphates, sodium metaphosphate, and zinc orthophosphate. The zinc source can be any zinc salt, zinc oxide or zinc metal. Specific examples of the zinc salts which can be used in this invention are zinc acetate, zinc chloride, zinc hydroxide and zinc orthophosphate. Finally, sources of the alkali metals includes the halide, acetate, nitrate, carbonate and hydroxide salts. Specific examples are sodium chloride, sodium nitrate, sodium acetate, sodium carbonate, sodium hydroxide, lithium chloride, lithium nitrate, lithium carbonate, lithium hydroxide, rubidium chloride, rubidium nitrate, rubidium carbonate, rubidium hydroxide, cesium chloride, cesium nitrate, cesium carbonate, cesium hydroxide, potassium chloride, potassium nitrate, potassium carabonate, potassium hydroxide.

Generally, the hydrothermal process used to prepare the zinc phosphate molecular sieves of this invention involves forming a reaction mixture which in terms of molar ratios of the oxides is expressed by the formula:

$$xM_2O:yZnO:P_2O_5:aH_2O.$$

where x ranges from greater than 1 to about 4, y ranges from about 1.6 to about 3, the ratio of x:y is greater than 0.5, and a ranges from about 20 to about 500. The individual reactants are added to a vessel which is inert to the reactants. As shown by the molar ratios above it is important that there be a molar excess of the alkali metal, otherwise a dense zinc phosphate phase may be formed.

It is also necessary to adjust the pH of the mixture to a value of about 4 to about 13. Preferably the pH should be from about 8 to about 12. It is important in most cases that the pH of the mixture be kept basic because at acidic pH dense zinc phosphate phase are more likely to form. The pH of the mixture can be controlled by using the hydroxide salt of the alkali metal or by adding an organic base or both. The organic bases which can be used are generally the amines and quaternary ammonium compounds.

The quaternary ammonium compounds are represented by the formula $R_4N^+$ where R is an alkyl group containing from 1 to 8 carbon atoms or an aryl group. Any of the mono-, di- and tri-amines can be used. Any one amine or quaternary ammonium compound may be used or any combination of amines and quaternary ammonium compounds can be used. Illustrative examples of these bases are: tetramethylammonium hydroxide, tetraethylammonium hydroxide, tetrapropylammonium hydroxide, tetrabutylammonium hydroxide, tetrapentylammonium hydroxide, di-n-propylamine, ethylbutylamine, tripropylamine, triethylamine, triethanolamine, piperidine, cyclohexylamine, 2-methylpyridine, N,N-dimethylbenzylamine, N,N-dimethylethanolamine, choline, N,N'-di-methylpiperazine, 1,4-diazabicyclo(2,2,2)octane, N-methyldiethanolamine, N-methylethanolamine, N-methylpiperidine, 3-methylpiperidine, N-methylcyclohexylamine, 3-methylpyridine, 4-methylpyridine, quinuclidine, N,N'-dimethyl-1,4-diazabicyclo(2,2,2,)octane ion, di-n-butylamine, neopentylamine, di-n-pentylamine, diisopropylamine, t-butylamine, ethylenediamine, pyrrolidine, and 2-imidazolidone.

Having formed the reaction mixture, it is next reacted at a temperature of about 0° to about 200° C. for a period of about 2 seconds to about 120 hours. The reaction is carried out under atmospheric pressure or the reaction vessel may be sealed and the reaction rung at autogenous pressure. In a preferred method the phosphorus source is orthophosphoric acid, the zinc source is zinc chloride, the temperature is from about 20° to about 150° C. and the time required to crystallize the product is from about 2 seconds to about 60 hours. It is preferred that the ratio of oxides in the reaction mixture be in the range of 3 $M_2O$: 2+q $ZnO$: 1 $P_2O_5$: 100-500 $H_2O$, where q ranges from zero to about 0.7.

As will be shown in detail in the examples, the zinc phosphate molecular sieves of this invention can form at a much more rapid rate and at a lower temperature than other oxide molecular sieves. These novel properties may allow for the low cost commercial production of certain zinc phosphate materials by precipitation at low temperatures.

One function of the alkali metal is to act as a structure directing agent. However, not all the alkali metals which can be used to prepare certain species of zinc phosphates are suitable for the preparation of all members of the generic class. The relationship of specific alkali metals to the individual product species is apparent from the illustrative examples set forth herein. Mixtures of the alkali metals can also be used as structure directing agents. Again the mixtures may provide some structures but not necessarily all the structures or members of the generic class.

Since the alkali metals are acting as structure directing agents, when the zinc phosphate molecular sieve is synthesized, a portion of the alkali metal will be present in the pores of the molecular sieve. Once the molecular sieve is formed, the alkali metal or metals within the pores of the sieve act as a counter ion to the negative framework charge. If it is desirable to have a zinc phosphate molecular sieve substantially free of alkali metal cations, the alkali metal/metals may be replaced by hydronium or ammonium ions by ion exchange or other techniques known in the art. Additionally, if a different alkali metal is desired, then ion exchange can be used to substitute one alkali metal for another alkali metal. However, because of the framework charge, some counter ion must always be present.

As stated, the zinc phosphate molecular sieves of this invention have a high framework charge and a high charge gradient. Because of their high framework charge and high charge gradient, the zinc phosphate molecular sieves of this invention may be used to separate mixtures of molecular species. If water is present within the pores of the molecular sieve, then the molecular sieve must be activated in order to remove at least a portion of the water. This can be done by means well known in the art such as heating at a temperature of about 100° to about 400° C. or subjecting the sample to a high vacuum.

The crystalline materials of this invention are capable of separating mixtures of molecular species based on the molecular size (kinetic diameters) or on the degree of polarity of the molecular species. When the separation of molecular species is based on molecular size, the crystalline microporous material is chosen in view of the dimensions of its pores such that at least the smallest molecular species of the mixture can enter the intracrystalline void space while at least the largest species is excluded. The kinetic diameters of various molecules such as oxygen, nitrogen, carbon dioxide, carbon monoxide are provided in D. W. Breck, ZEOLITE MOLECULAR SIEVES, John Wiley and Sons (1974) p. 636.

When the separation is based on degree of polarity, it is generally the case that the more hydrophilic crystalline material of this invention will preferentially adsorb the more polar molecular species of a mixture having different degrees of polarity even though both molecular species can communicate with the pore system of the crystalline material. For example water, which is more polar, will be preferentially adsorbed over common hydrocarbon molecules such as paraffins olefins, etc.

Thus, the crystalline material of this invention can be used as desiccants in such adsorption separation/purification processes as natural gas drying, cracked gas drying, etc.

If one of the molecular species, e.g., water, is a small impurity, the separation may be effected in the conventional manner by simply passing the stream to be treated through a bed of the particular crystalline material desired. As the operation of the process continues, there develops in the bed a so-called "front" between the material loaded with the impurity, e.g., water, and the material not so loaded. This front moves through the bed in the direction of gas flow. Before the front reaches the downstream end of the bed, the bed is regenerated by cutting off the flow of feed stream and passing through the bed a purge gas which (usually at a temperature of about 50°-150° C.) desorbs the impurity, e.g., water, from the bed. If the purge gas is adsorbed on the bed, this gas can be removed by passing one or two bed volumes of the feed stream through the bed.

If the concentration of one of the species in the mixture is large, e.g., several percents, other conventional techniques, such as pressure swing adsorption (PSA) and thermal swing adsorption may be used. Such techniques are well known to those skilled in the separation art. See, e.g., U.S. Pat. Nos. 4,723,966, 4,589,888, and 4,398,926. For example, a pressure swing adsorption process will operate at a temperature and pressure sufficient to effect the adsorption and desorption of the component or molecular specie which one wants to remove. Typically the temperature is preferably maintained in the range of about $-50°$ to 100° C. and preferably from about 0° to 50° C. The pressure during adsorption can vary from about 0.2 psia (1.4 kPa) to about 1500 psia (10,342 kPa), preferably from about 50 psia (344 kPa) to about 500 psia (3,447 kPa) and more preferably from about 75 psia (517 kPa) to about 350 psia (2,413 kPa). The pressure during desorption is lower than during adsorption and effective to cause desorption of the adsorbed component. The range of this pressure is from about 0.1 torr (1.3 Pa) to 150 psia (1,034 kPa), preferably from about 0.1 torr (1.3 Pa) to 15 psia (103 kPa) and more preferably from about 0.1 torr (1.3 Pa) to about 250 torr (333 Pa). The cyclic process can comprise additional adsorption and regeneration steps as well as intermediate depressurization and purging steps.

The crystalline microporous compositions of the present invention either as synthesized or after calcination can be used as catalysts or catalyst supports in a hydrocarbon conversion process. Hydrocarbon conversion processes are well known in the art and include cracking, hydrocracking, alkylation of both aromatics and isoparaffin, isomerization, polymerization, reforming, hydrogenation, dehydrogenation, transalkylation, dealkylation, hydration, dehydration, hydrotreating, hydrodenitrogenation, hydrodesulfurization, methanation and syngas shift process. Specific reaction conditions and the types of feeds which can be used in these processes are set forth in U.S. Pat. Nos. 4,310,440 and 4,440,871 which are incorporated by reference. Preferred hydrocarbon conversion processes are those in which hydrogen is a component such as hydrotreating or hydrofining, hydrogenation, hydrocracking, hydrodenitrogenation, hydrodesulfurization, etc.

The structure of the zinc phosphate sieves of this invention was determined by X-ray analysis. The X-ray patterns were obtained using standard X-ray powder diffraction techniques. The radiation source is a high-intensity, copper target, X-ray tube operated at 50 Kv and 40 ma. The diffraction pattern from the copper K-alpha radiation and graphite monochromator is suitably recorded by an X-ray spectrometer scintillation counter, pulse height analyzer and strip chart recorder. Flat compressed powder samples are scanned at 2° (2 theta) per minute, using a two second time constant. Interplanar spacings (d) in Angstrom units are obtained from the position of the diffraction peaks expressed as $2\Theta$ where $\Theta$ is the Bragg angle as observed on the strip chart. Intensities are determined from the heights of diffraction peaks after subtracting background, "$I_o$" being the intensity of the strongest line or peak, and "I" being the intensity of each of the other peaks.

Alternatively, the X-ray patterns are obtained from the copper K-alpha radiation by use of computer based techniques using a Siemens D-500 X-ray powder diffractometer, Siemens Type K-805 X-ray sources, available from Siemens Corporation, Cherry Hill, N.J., with appropriate computer interface.

As will be understood by those skilled in the art the determination of the parameter 2 theta is subject to both human and mechanical error, which in combination can impose an uncertainty of about ±0.4° on each reported value of 2 theta. This uncertainty is, of course, also manifested in the reported values of the d-spacings, which are calculated from the 2 theta values. This imprecision is general throughout the art and is not sufficient to preclude the differentiation of the present crystalline materials from each other and from the compositions of the prior art. In some of the X-ray patterns reported, the relative intensities of the d-spacings are indicated by the notations vs, s, m, and w which represent very strong, strong, medium, and weak, respectively. In terms of 100 X $I/I_o$, the above designations are defined as w=0-15; m=15-60; s=60-80 and vs=80-100.

In certain instances the purity of a synthesized product may be assessed with reference to its X-ray powder diffraction pattern. Thus, for example, if a sample is stated to be pure, it is intended only that the X-ray pattern of the sample is free of lines attributable to crystalline impurities, not that there are no amorphous materials present.

To allow for ready reference, the different structure types in the following examples have been given arbitrary numbers such as structure type 1. Thus sodium zinc phosphate-1 and lithium zinc phosphate-1 are the same structure type.

In order to more fully illustrate the variety of species to be derived from the instant invention, the following examples are set forth. It is to be understood that the examples are only by way of illustration and are not intended as an undue limitation on the broad scope of the invention as set forth in the appended claims.

EXAMPLE 1

Synthesis of a Dense Phase Sodium Zinc Phosphate

A reaction mixture was prepared by dissolving 46.2 g. of 85% $H_3PO_4$ (orthophosphoric acid) in 94 g. of distilled water while stirring, after which 87.8 g. of $Zn(CH_3COO)_2 \cdot 4H_2O$ (zinc acetate) was added, forming a white precipitate. To this slurry 23.2 g. of NaCl was added. The composition of the reaction mixture expressed in anhydrous oxide ratios of the reagents was:

$Na_2O : 2\ ZnO : P_2O_5$

The reaction mixture was divided into several portions. To one portion of the slurry 40% tetraethylammonium hydroxide was added dropwise while stirring until the pH had risen from an initial 2.3 to a final value of 6.0 (sample A). Another portion of the initial slurry with pH 2.3 was similarly adjusted to pH 8.5 (sample B), and still another portion of the slurry was adjusted as above to pH 9.5 (sample C). The resulting reaction mixtures, A, B and C, were further divided into portions and digested as follows: Two portions of A were each digested for 48 hr. at 100° and 150° C., respectively. Digestions at 100° C. were carried out in sealed Teflon TM bottles, while digestions at temperatures greater than 100° C. were carried out in Teflon TM -lined stainless steel pressure vessels. Three portions of sample B were each digested for 48 hr. at 100°, 150° and 200° C., respectively. Mixture C was digested for 48 hr. at 100° C. The solid reaction products were isolated by filtration, washed with distilled water, and dried at room temperature. The x-ray powder diffraction patterns of all of the above products indicated the major crystalline phase in all cases was $NaZnPO_4$, JCPDS #1-911, which is a dense phase similar in structure to nepheline.

EXAMPLE 2

Preparation of sodium zinc phosphate with a Sodalite-like Framework, structure type-1.

A reaction mixture was prepared by dissolving 34.5 g. of 85% $H_3PO_4$ in 73.4 g. of distilled water while stirring, after which 65.4 g. of $Zn(CH_3COO)_2 \cdot 4H_2O$ was added, forming a white precipitate. To this slurry 48.6 g. of NaCl was added. The composition of the reaction mixture expressed in anhydrous oxide ratios of the reagents was:

$2.8\ Na_2O : 2\ ZnO : P_2O_5$

The reaction mixture was divided into several portions. To one portion of the slurry 40% tetraethylammonium hydroxide was added dropwise while stirring until the pH had risen from an initial 2.3 to a value of 5.1 (mixture D). Another portion of the initial slurry was similarly adjusted to pH 8.5 (mixture E), and still another portion of the slurry was adjusted as above to pH 11.0 (mixture F). The resulting reaction mixtures were further divided into portions and digested as follows: Two portions of mixture D were each digested for 48 hr. at 100° and 150° C., respectively. Two portions of mixture E were each digested for 48 hr. at 100° and 150° C., respectively. Two portions of mixture F were each digested for 48 hr. at 100° and 150° C., respectively. Reaction vessels were used as described in example 1. the solid reaction products were isolated by filtration, washed with distilled water, and dried at room temperature.

The X-ray powder diffraction patterns of all of the above products except one indicated that the major crystalline phase was $NaZnPO_4$, JCPDS #1-911, which is a dense phase similar in structure to nepheline. X-ray powder diffraction of the product recovered from mixture F which had been digested for 48 hr. at 100° C. indicated that the product was different from the others above. Chemical analysis of this product revealed the presence of 12.99 wt. % $Na_2O$, 33.0 wt. % ZnO, 31.65 wt. % P$_2$O$_5$, and 23.4 wt. % LOI, giving a product composition of:

0.94Na$_2$O.1.82ZnO.P$_2$O$_5$.5.8 H$_2$O

The x-ray powder diffraction pattern of this product was characterized by the data shown in Table 1

TABLE 1

| 2Θ | d(Å) | 100 × I/I$_o$ |
| --- | --- | --- |
| 14.12 | 6.27 | 89 |
| 20.05 | 4.43 | 27 |
| 22.46 | 3.96 | 12 |
| 24.64 | 3.61 | 100 |
| 28.54 | 3.13 | 28 |
| 32.00 | 2.80 | 89 |
| 35.15 | 2.55 | 96 |
| 36.64 | 2.45 | 13 |
| 38.08 | 2.36 | 33 |
| 43.43 | 2.08 | 16 |
| 45.91 | 1.98 | 10 |
| 47.11 | 1.93 | 14 |
| 48.30 | 1.88 | 10 |
| 50.60 | 1.80 | 7 |
| 52.81 | 1.73 | 10 |

The above data indicates that the sodium zinc phosphate product possesses a sodalite-like framework topology, with a cubic unit cell having an $a_o = 8.84$ Å and shows that the product is microporous.

EXAMPLE 3

Preparation of lithium zinc phosphate with an ABW-like Framework, structure type 2

Reaction mixture G was prepared by dissolving 22 g. of Zn(CH$_3$COO)$_2$.4H$_2$O in 132.4 g. of distilled water while stirring. Reaction mixture H was prepared by dissolving 7.2 g. LiOH in 132.4 g. of H$_2$O, after which 11.5 g. of 85% H$_3$PO$_4$ was added, forming a white precipitate. Reaction mixture H was added to reaction mixture G to form a slurry with a pH of 4.8. The composition of the reaction mixture was:

3 Li$_2$O:2 ZnO:P$_2$O$_5$:300 H$_2$O

The reaction mixture was divided into portions 1 and 2. Reaction vessels were used as described in Example 1. Portion 1 was divided into two parts and digested at 100° C. for 1 hr and 2 hr., respectively. Solid products were obtained by filtering, washing with water and drying at room temperature to give samples J and K respectively. To portion 2 of the slurry 40% tetraethylammonium hydroxide (TEAOH) was added dropwise while stirring until the pH had risen to a value of 11.7. The resultant mixture was divided into two halves. One half was filtered, washed with water, and dried at room temperature to isolate a solid product, sample L. The other half was digested at 100° C. for 1 hr, at which time the resultant product mixture was filtered, washed with water, and dried at room temperature to isolate a solid product sample M. Chemical analysis of sample J indicated the presence of 7.70 wt % Li$_2$O, 42.88 wt. % ZnO, 39.32 wt. % P$_2$O$_5$, and 10.60 wt % LOI, giving a product composition of:

0.93Li$_2$O.1.9 ZnO.P$_2$O$_5$.2.12 H$_2$O

X-ray powder diffraction analyses of the solid products, J, K, L and M, revealed that the major product (>95% of the crystalline material) was characterized by the x-ray powder diffraction data in Table 2.

TABLE 2

| 2Θ | d(Å) | 100 × I/I$_o$ |
| --- | --- | --- |
| 13.80 | 6.42 | 100 |
| 16.90 | 5.25 | 6 |
| 20.16 | 4.41 | 19 |
| 20.83 | 4.26 | 8 |
| 21.91 | 4.06 | 3 |
| 27.77 | 3.21 | 48 |
| 29.57 | 3.02 | 22 |
| 33.11 | 2.71 | 3 |
| 33.82 | 2.65 | 10 |
| 34.21 | 2.62 | 7 |
| 35.80 | 2.51 | 3 |
| 37.39 | 2.41 | 2 |
| 37.77 | 2.38 | 3 |
| 38.41 | 2.34 | 5 |
| 38.74 | 2.32 | 2 |
| 40.32 | 2.24 | 3 |
| 44.64 | 2.03 | 9 |
| 48.28 | 1.89 | 2 |
| 48.79 | 1.87 | 2 |
| 51.78 | 1.77 | 5 |
| 52.26 | 1.75 | 2 |

The above data indicate that the lithium zinc phosphate product possesses an ABW-like framework topology with an orthorhombic unit cell having $a = 8.12$ Å, $b = 10.45$ Å, and $c = 5.02$ Å, showing that the product is microporous. The framework structure is similar to the lithium aluminosilicate zeolitic ABW framework which has an orthorhombic unit cell having $a = 8.18$, $b = 10.30$, and $c = 5.00$ (R. M. Barrer and E. A. D. White, J. Chem. Soc. 1167 (1951); JCPDC #27-1211). The data presented above also demonstrate that microporous zinc phosphate frameworks can be synthesized over a wide pH range and in some cases can form shortly after the reagents are combined at ambient temperature.

EXAMPLE 4

Formation of sodium zinc phosphate, structure type 1

The entire experiment which follows was carried out with the reaction vessel immersed in an ice-water bath. A reaction mixture was prepared by dissolving 23.1 g. of 85% H$_3$PO$_4$ in 50.6 g. of distilled water while stirring, after which 43.9 g. of Zn(CH$_3$COO)$_2$.4H$_2$O was added, forming a white precipitate. To this slurry 34.8 g. of NaCl was added, followed by 252.7 g. of 40% TEAOH giving a final pH of 12.3 at a temperature of 19° C., which was the highest temperature attained by the reaction mixture during the synthesis. The composition of the reaction mixture was:

6.86 TEAOH:3.0 Na$_2$O:2ZnO:P$_2$O$_5$:120 H$_2$O

The solid from a portion of the reaction mixture was recovered by filtration, washed with water, and dried in air at room temperature and identified as sample N. X-ray powder diffraction analysis of sample N showed a pattern identical to that given in Table 1 of Example 2. The crystallinity of sample N was nearly identical to that of sample F in Example 2.

EXAMPLE 5

A. Preparation of rubidium zinc phosphate, structure type 3

Reaction mixture A1 was prepared by dissolving 11.0 g. of ZnCl$_2$ in 105.9 g. of distilled water. Reaction mixture B1 was prepared by dissolving 29.0 g. of RbCl in 105.9 g. of water, followed by addition of 9.2 g. of 85% H₃PO₄. Reaction mixture B1 was then added to reaction mixture A1, to form a reaction slurry of pH 1.1. The pH was increased to 12.4 by addition of 156.6 g. of 40% TEAOH giving a final composition:

10.6 TEAOH:3 Rb₂O:2ZnO:P₂O₅:430 H₂O

The mixture was sealed in a Teflon TM bottle and heated at 100° C. for 24 hr. The product was recovered by centrifugation, washed with water, dried at room temperature and identified as sample O. The X-ray powder diffraction pattern of sample O is characterized by the data in Table 3.

TABLE 3

| 2θ | d(A) | 100 × I/I₀ |
|---|---|---|
| 11.42 | 7.75 | 40 |
| 18.09 | 4.90 | 15 |
| 19.94 | 4.45 | 36 |
| 21.54 | 4.12 | 11 |
| 22.97 | 3.87 | 24 |
| 23.28 | 3.82 | 17 |
| 26.02 | 3.42 | 7 |
| 28.32 | 3.15 | 100 |
| 29.68 | 3.01 | 18 |
| 31.73 | 2.82 | 7 |
| 32.96 | 2.72 | 28 |
| 33.77 | 2.65 | 12 |
| 34.80 | 2.58 | 39 |
| 35.22 | 2.55 | 5 |
| 35.81 | 2.51 | 7 |
| 36.77 | 2.44 | 6 |
| 37.21 | 2.42 | 12 |
| 38.64 | 2.33 | 8 |
| 39.05 | 2.31 | 3 |
| 39.95 | 2.26 | 5 |
| 40.57 | 2.22 | 6 |
| 41.44 | 2.18 | 6 |
| 43.95 | 2.06 | 11 |
| 48.69 | 1.87 | 4 |
| 49.20 | 1.85 | 4 |
| 50.05 | 1.82 | 15 |
| 50.37 | 1.81 | 6 |
| 53.08 | 1.73 | 4 |
| 53.58 | 1.71 | 5 |
| 54.42 | 1.69 | 10 |

Elemental analysis of sample O showed the presence of 30.45 wt. % Rb₂O, 37.85 wt. % ZnO, 22.8 wt. % P₂O₅, and 9.95 wt. % LOI, giving a product composition of:

1.01Rb₂O.2.9ZnO.P₂O₅.3.44 H₂O

B. Preparation of rubidium zinc phosphate, structure type 3

Reaction mixture A2 was prepared by dissolving 16.4 g. of ZnCl₂ in 159.0 g. of distilled water. Reaction mixture B1 was prepared by dissolving 43.8 g. of RbCl in 158.9 g. of distilled water, followed by addition of 14.1 g. of 85% H₃PO₄. Reaction mixture B2 was then added to reaction mixture A2 to form a reaction slurry of pH 1.1. The pH was increased to 11.1 by addition of 50% RbOH. The mixture was sealed in a Teflon TM bottle and heated at 100° C. for 23 hrs. The resultant product was recovered by centrifugation, washed with water, dried at room temperature and identified as sample P. The X-ray powder diffraction pattern of the major product of sample P was identical to the data in Table 3. Approximately 10% zinc oxide, JCPDS #36-1451, was also present as an impurity.

EXAMPLE 6

Preparation of cesium zinc phosphate, structure type 3

Reaction mixture A4 was prepared by dissolving 35.4 g. of ZnCl₂ in 344.1 g. of distilled water. Reaction mixture B4 was prepared by dissolving 117.0. g. of CsOH in 344.1 g. of distilled water, followed by addition of 30.0 g. of 85% H₃PO₄. Reaction mixture B4 was then added to reaction mixture A4, to form a reaction slurry of pH 5.6. The pH was increased to 12.0 by addition of 57.4 g. of 25% tetramethylammonium hydroxide (TMAOH), giving a final composition:

1.22 TMAOH:3 Cs₂O:2 ZnO:P₂O₅:312 H₂O

The reaction slurry was sealed in a Teflon TM botle and heated at 100° C. for 2 hr. at which time the resultant product was recovered by centrifugation, washed with water, dried at room temperature and identified as sample R. The X-ray powder diffraction pattern of sample R is characterized by the data in Table 4.

TABLE 4

| 2θ | d(A) | 100 × I/I₀ |
|---|---|---|
| 11.35 | 7.79 | 15 |
| 17.92 | 4.95 | 27 |
| 19.72 | 4.50 | 44 |
| 21.30 | 4.17 | 28 |
| 22.76 | 3.91 | 39 |
| 22.91 | 3.88 | 38 |
| 25.65 | 3.47 | 15 |
| 28.01 | 3.19 | 100 |
| 29.27 | 3.05 | 27 |
| 30.63 | 2.92 | 6 |
| 31.36 | 2.85 | 4 |
| 32.53 | 2.75 | 25 |
| 33.41 | 2.68 | 16 |
| 34.43 | 2.60 | 63 |
| 35.41 | 2.53 | 15 |
| 36.65 | 2.45 | 12 |
| 38.23 | 2.35 | 7 |
| 38.44 | 2.34 | 7 |
| 39.36 | 2.29 | 11 |
| 40.06 | 2.25 | 5 |
| 40.91 | 2.21 | 8 |
| 41.74 | 2.16 | 8 |
| 43.44 | 2.08 | 16 |
| 48.13 | 1.89 | 6 |
| 48.36 | 1.88 | 6 |
| 49.46 | 1.84 | 20 |
| 53.76 | 1.71 | 11 |

EXAMPLE 7

Preparation of rubidium cesium zinc phosphate, structure type 3

Reaction mixture A5 was prepared by dissolving 15.1 g. of ZnCl₂ in 97.5 g. of distilled water. Reaction mixture B5 was prepared by dissolving 16.9 g. of RbOH and 24.8 g. of CsOH in 191.6 g. of distilled water, followed by addition of 12.7 g. of 85% H₃PO₄. Reaction mixture A5 was then added to reaction mixture B5, to form a reaction slurry of pH 5.6. The pH was increased to 11.4 by addition of 19.7 g. of 25% TMAOH, giving a final composition:

0.99 TMAOH:1.5 Rb₂O:1.5 Cs₂O:2 ZnO:P₂O₅:313 H₂O

A portion of the mixture was sealed in Teflon TM bottle and heated at 100° C. for 2 hr. while another portion of the mixture was similarly digested for 24 hours. The resultant products were recovered by centrifugation, washed with water, dried at room temperature and identified as samples S and T. The X-ray powder diffraction patterns of samples S and T were identical and are characterized by the data in Table 5.

TABLE 5

| 2Θ | d(Å) | 100 · I/I$_o$ |
|---|---|---|
| 11.45 | 7.73 | 37 |
| 18.11 | 4.90 | 20 |
| 19.94 | 4.45 | 37 |
| 21.54 | 4.13 | 17 |
| 22.99 | 3.87 | 24 |
| 23.22 | 3.83 | 22 |
| 25.96 | 3.43 | 8 |
| 28.30 | 3.15 | 100 |
| 29.61 | 3.02 | 25 |
| 31.67 | 2.83 | 5 |
| 32.90 | 2.72 | 27 |
| 33.75 | 2.66 | 14 |
| 34.79 | 2.58 | 44 |
| 35.78 | 2.51 | 9 |
| 37.07 | 2.43 | 12 |
| 38.60 | 2.33 | 8 |
| 38.91 | 2.31 | 5 |
| 39.82 | 2.26 | 6 |
| 40.52 | 2.23 | 4 |
| 41.37 | 2.18 | 7 |
| 42.16 | 2.14 | 4 |
| 43.89 | 2.06 | 12 |
| 49.98 | 1.82 | 14 |
| 54.34 | 1.69 | 10 |

The product which had been digested for 24 hours was subjected to chemical analysis, which revealed the presence of 21.70 weight percent $P_2O_5$, 34.71 weight percent ZnO, 12.39 weight percent $Cs_2O$, 22.57 weight percent $Rb_2O$, and 8.3 weight percent LOI, giving a product composition in terms of ratio of oxides of

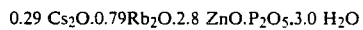

0.29 $Cs_2O$.0.79$Rb_2O$.2.8 $ZnO.P_2O_5$.3.0 $H_2O$

EXAMPLE 8

Preparation of cesium zinc phosphate, structure type 3

Reaction mixture A6 was prepared by dissolving 7.4 g. of $ZnCl_2$ in 71.4 g. of distilled water. Reaction mixture B6 was prepared by dissolving 24.6 g. of CsOH in 71.4 g of distilled water, followed by addition of 6.2 g. of 85% $H_3PO_4$. Reaction mixture B6 was then added to reaction mixture A6. The pH was increased to 12.1 by addition of 11.4 g. of 25% TMAOH, giving a final composition:

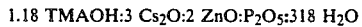

1.18 TMAOH:3 $Cs_2O$:2 $ZnO:P_2O_5$:318 $H_2O$

The mixture was sealed in a Teflon TM bottle and heated at 100° C. for 5 days. The product was recovered by filtration, washed with water, and dried at room temperature. The X-ray powder diffraction pattern of the product was essentially identical to the data in Table 4. Elemental analysis revealed the presence of 20.20 weight percent $P_2O_5$, 31.72 weight percent ZnO, 40.32 weight percent $Cs_2O$ and 6.60 weight percent LOI, giving a product composition of:

$Cs_2O$.2.74 $ZnO.P_2O_5$.2.58 $H_2O$

EXAMPLE 9

Adsorption capacities of the rubidium zinc phosphate and cesium zinc phosphate compositions of structure type 3 were measured using a McBain-Bakr gravimetric adsorption apparatus. The following data were obtained on samples activated at 90° C. The results obtained for the cesium zinc phosphate are presented in Table 6, while the results for the rubidium zinc phosphate are presented in Table 7.

TABLE 6

Adsorption Data for Cesium Zinc Phosphate Type 3

| Adsorbate | Kinetic Diameter (Å) | Pressure (Torr) | Temp °C. | Wt. % Adsorbed |
|---|---|---|---|---|
| $H_2O$ | 2.65 | 4.7 | 25 | 4.6 |
| $H_2O$ | 2.65 | 10 | 25 | 5.2 |
| $H_2O$ | 2.65 | 17.3 | 25 | 5.5 |
| $CO_2$ | 3.3 | 760 | 25 | 0 |
| $CO_2$ | 3.3 | 697 | 82 | 0 |

TABLE 7

Adsorption Data for Rubidium Zinc Phosphate Type 3

| Adsorbate | Kinetic Diameter (Å) | Pressure (Torr) | Temp °C. | Wt. % Adsorbed |
|---|---|---|---|---|
| $H_2O$ | 2.65 | 4.7 | 25 | 5.4 |
| $H_2O$ | 2.65 | 10 | 25 | 9.0 |
| $H_2O$ | 2.65 | 17.3 | 25 | 14.0 |
| $CO_2$ | 3.3 | 760 | 25 | 0 |
| $CO_2$ | 3.3 | 697 | 82 | 1.1 |

The data indicate that both cationic forms of structure type 3 possess a pore size of greater than 2.65 Å, but that both materials have pore sizes somewhat less than 3.3 Å. The 82° C. adsorption of $CO_2$ in the Rb material indicates an activated diffusion mechanism, in which the pore size is somewhat less than 3.3 Å at room temperature but enlarges somewhat to approximately 3.3 Å when the material is heated. The Cs form of the material has a small enough apparent pore size to exclude $CO_2$ at all temperatures, owing to the larger Cs cation in the intracrystalline pore system blocking the entry of molecules larger than $H_2O$.

I claim as my invention:

1. A crystalline molecular sieve having: 1) a three-dimensional microporous framework structure of $ZnO_2$ and $PO_2$ tetrahedral units; 2) an intracrystalline pore system; and 3) an empirical chemical composition on an anhydrous basis expressed as the ratio of the oxides, by the formula: $rM_2O:sZnO:P_2O_5$, where M is at least one alkali metal, r ranges from about 0.9 to about 1.5 and s ranges from about 1.8 to about 3.0.

2. The crystalline molecular sieve of claim 1 where r ranges from about 0.9 to about 1.5 and s ranges from about 2.2 to about 3.0.

3. The crystalline molecular sieve of claim 1 where the molecular sieve has the structure of zeolite ABW.

4. The crystalline molecular sieve of claim 1 where the molecular sieve has the structure of sodalite.

5. The crystalline molecular sieve of claim 1 where the molecular sieve is characterized by the X-ray diffraction pattern which contains at least the d-spacings set forth in Table 3

TABLE 3

| 2Θ | d(Å) | 100 · I/I$_o$ |
|---|---|---|
| 11.42 | 7.75 | 40 |
| 18.09 | 4.90 | 15 |
| 19.94 | 4.45 | 36 |
| 21.54 | 4.12 | 11 |
| 22.97 | 3.87 | 24 |
| 23.28 | 3.82 | 17 |

TABLE 3-continued

| 2Θ | d(A) | 100 · I/I₀ |
|---|---|---|
| 26.02 | 3.42 | 7 |
| 28.32 | 3.15 | 100 |
| 29.68 | 3.01 | 18 |
| 31.73 | 2.82 | 7 |
| 32.96 | 2.72 | 28 |
| 33.77 | 2.65 | 12 |
| 34.80 | 2.58 | 39 |
| 35.22 | 2.55 | 5 |
| 35.81 | 2.51 | 7 |
| 36.77 | 2.44 | 6 |
| 37.21 | 2.42 | 12 |
| 38.64 | 2.33 | 8 |
| 39.05 | 2.31 | 3 |
| 39.95 | 2.26 | 5 |
| 40.57 | 2.22 | 6 |
| 41.44 | 2.18 | 6 |
| 43.95 | 2.06 | 11 |
| 48.69 | 1.87 | 4 |
| 49.20 | 1.85 | 4 |
| 50.05 | 1.82 | 15 |
| 50.37 | 1.81 | 6 |
| 53.08 | 1.73 | 4 |
| 53.58 | 1.71 | 5 |
| 54.42 | 1.69 | 10. |

6. A process for preparing a crystalline molecular sieve having: 1) a three-dimensional microporous framework structure of $ZnO_2$ and $PO_2$ tetrahedral units; 2) an intracrystalline pore system; and 3) an empirical chemical composition on an anhydrous basis expressed by the formula: $rM_2O:sZnO:P_2O_5$, where M is at least one alkali metal, r ranges from about 0.9 to about 1.5 and s ranges from about 1.8 to about 3.0, the process comprising reacting a mixture containing reactive sources of zinc, phosphorus and M at a temperature and time sufficient to form the crystalline molecular sieve, the mixture having a composition expressed in terms of mole ratios of oxides of:

$$xM_2O:yZnO:P_2O_5:aH_2O$$

where x range from greater than 1.0 to about 4, y ranges from about 1.6 to about 3, the ratio of x:y is greater than 0.5, and a ranges from about 20 to about 500.

7. The process of claim 6 where the temperature varies from about 0° to about 200° C. and the time varies from about 2 seconds to about 120 hours.

8. The process of claim 6 where the zinc source is selected from the group consisting of zinc acetate, zinc chloride, zinc hydroxide and zinc orthophosphate.

9. The process of claim 6 where the phosphorus source is selected from the group consisting of orthophosphoric acid, pyrophosphoric acid, alkali phosphates, sodium metaphosphate and zinc orthophosphate.

10. The process of claim 6 where the alkali metal source is selected from the group consisting of the halide, acetate, carbonate and hydroxide salts of the alkali metals.

* * * * *